United States Patent [19]

Snowden et al.

[11] 4,417,713
[45] Nov. 29, 1983

[54] SAFETY BELT CLAMP APPARATUS

[76] Inventors: Dennie C. Snowden, Dixon Mobile Home Pk., Lot #14, Leesburg, Ga. 31763; Elwood D. Moree, Rte. 1, Vienna, Ga. 31092

[21] Appl. No.: 201,461

[22] Filed: Oct. 28, 1980

[51] Int. Cl.³ .......................................... F16M 13/00
[52] U.S. Cl. .................................................... 248/228
[58] Field of Search ................. 248/72, 218.4, 219.2, 248/228, 340; 182/3, 9; 294/85

[56] References Cited

U.S. PATENT DOCUMENTS

| 72,778 | 12/1867 | Baker | 294/85 |
|---|---|---|---|
| 494,868 | 4/1893 | Kelly | 248/228 X |
| 1,497,208 | 6/1924 | Calvert | 248/340 X |
| 2,605,074 | 7/1952 | Bucsko | 248/219.1 X |
| 3,314,636 | 4/1967 | McHugh | 248/340 |
| 3,612,459 | 10/1971 | Walls | 248/340 X |

FOREIGN PATENT DOCUMENTS

| 40710 | 1/1910 | Austria | 182/9 |
|---|---|---|---|
| 539544 | 9/1941 | United Kingdom | 248/228 |

Primary Examiner—William H. Schultz
Attorney, Agent, or Firm—Jones & Askew

[57] ABSTRACT

A safety belt clamp apparatus including crossed arms operatively interconnected for scissor-like motion for grasping a beam. Connecting members pivotally attached to the end of the arms include openings for receiving a safety belt clip, so that pressure exerted on the clip away from the beam urges the clamp apparatus into tighter engagement with the beam. Additional rings are provided so that more than one person can be connected to a single clamp apparatus. In one embodiment of the invention, a diagonally extending brace and jaw assembly provides additional structure so that the clamp apparatus can be attached to a vertically extending beam.

5 Claims, 8 Drawing Figures

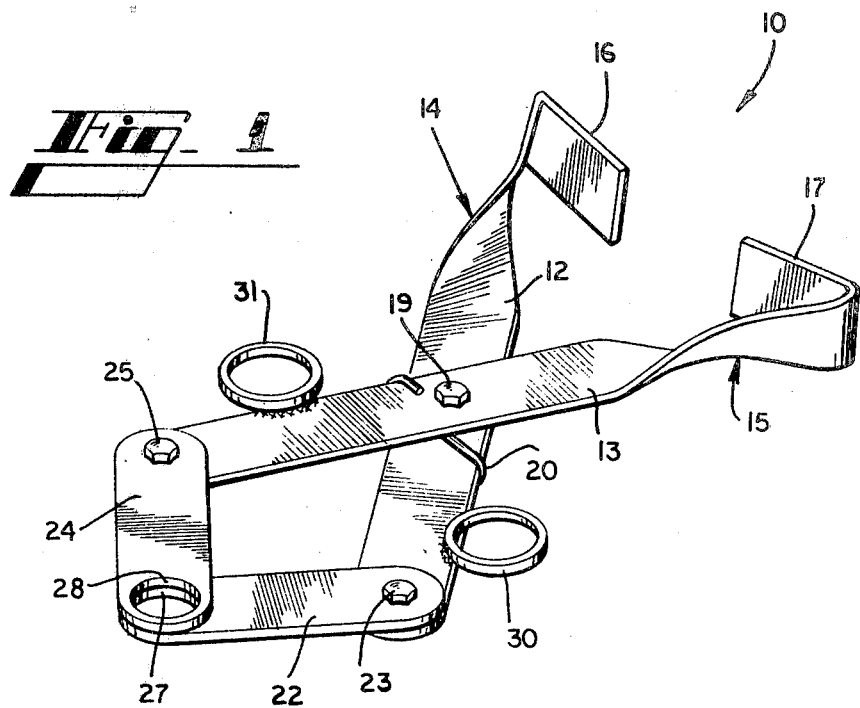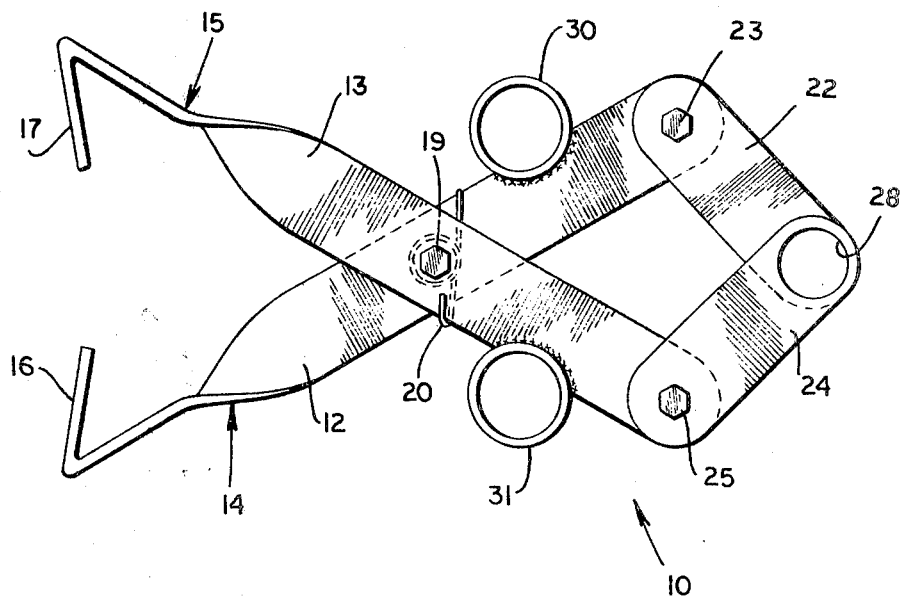

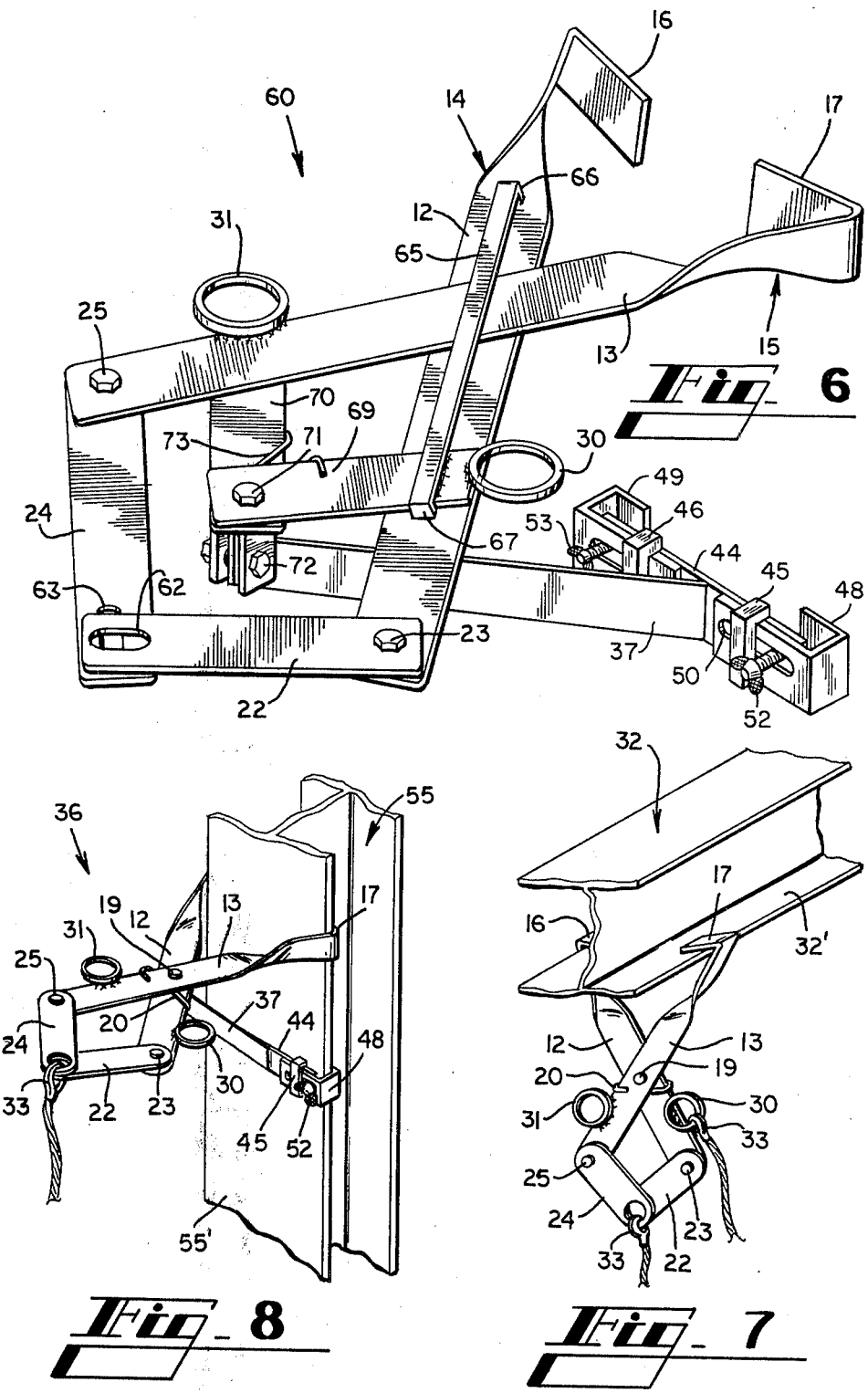

4,417,713

SAFETY BELT CLAMP APPARATUS

TECHNICAL FIELD

The present invention relates to safety apparatus for connecting persons, such as construction workers, to elevated structures on which they are working. The invention relates more particularly to a clamp for securing a safety belt or harness to a structural member such as an I-beam or a wooden beam or board.

BACKGROUND ART

Workers in tall construction projects continually face the danger of falling great distances to the ground. Such workers often must walk along narrow beams and perform difficult and awkward tasks at very high elevations. This is particularly true in the case of skyscrapers and the like constructed of structural steel I-beams. Even where the height is not as great, e.g., twenty or thirty feet above the floor, a fall from that height onto a concrete surface can seriously injure a worker.

In order to protect the worker against the danger of falling, a device is needed to attach the worker to the structure while permitting freedom of movement sufficient to allow the worker to complete his tasks without interference from the attaching device. Furthermore, the worker needs to be able to move the attaching device from place to place easily. The device must therefore be readily connected to and disconnected from the structure. Prior attempts to provide safety devices for workers are shown in U.S. Pat. Nos. 2,303,954, 3,217,833 and 4,171,032. These devices are relatively complex, and do not combine inexpensive construction with the advantages of positive attachment to the structure and ease of movement of the device from place to place.

U.S. Pat. No. 1,128,277 discloses a prior art device for gripping and hoisting I-beams. U.S. Pat. No. 494,868 discloses a support for a ladder or scaffold.

SUMMARY OF THE INVENTION

The present invention provides an improved safety belt clamp apparatus which is easily removable from a structural beam, but provides a safe, positive connection to such a beam and can be moved from place to place along the beam.

Generally described, the invention is a clamp apparatus for releasably connecting a safety belt or harness to a beam, comprising a pair of arms pivotally connected intermediate the ends thereof and each defining at a first end an inwardly turning hook member. A connecting member is pivotally connected to a second end of each of the arms at one end of the connecting member, and defines a matching clip-receiving opening adjacent to the other end of the connecting member. A pair of clip receiving rings, one attached to each of the arms between the clip-receiving opening and the pivotal connection of the arms are provided, and a spring urges the hook members toward one another. It will thus be seen that a plurality of safety belt clips can be engaged with the clip openings and the rings to protect several workers. The force exerted by the safety belts at the location of the clip openings and rings tends to cause a scissor-like motion of the clamp apparatus whereby the hook members are urged against the beam to provide a safe attachment to the beam.

In another embodiment of the invention, a brace extends diagonally from the pivotal connection of the arms away from the plane of the arms in the direction of the hook members. A jaw assembly is mounted on the extending end of the brace for engaging the beam at a location spaced apart from the point at which the hook members engage the beam. This embodiment permits the clamp apparatus of the invention to be utilized on vertically extending beams as well as horizontally extending beams.

Yet another embodiment of the invention provides a slot-like interconnection of the arms of the clamp apparatus rather than a fixed pivot axis. A pair of link members is fixed to the arms, one on each arm between the interconnection of the arms and the connecting members. The link members extend away from the arms to be pivotally connected to each other between the arms. A brace and jaw assembly can be added to this embodiment by connection to the link members where they are joined.

In the first and second embodiment, a spring operatively associated with the arms urges the hook members together, so that the clamp apparatus cannot accidentally fall off the beam. In the third embodiment, a spring is operatively associated with the link members, urging the link members apart, and thereby urging the hook members together.

Thus, it is an object of the present invention to provide an improved clamp apparatus for a safety belt or harness to secure a person to a beam of an elevated structure.

A further object of the present invention is to provide a safety belt clamp apparatus that can serve to provide an attachment to a structure for a plurality of persons, and that can be moved along a beam or easily disconnected and reconnected to a beam.

It is a further object of the present invention to provide a safety belt clamp apparatus that can be secured to a vertically extending beam.

It is a further object of the present invention to provide a safety belt clamp apparatus that will not be accidentally dislodged from a beam, but which can be easily disconnected from the beam.

Other objects, features and advantages of the present invention will become apparent from reading the following detailed description of the invention, when taken in conjunction with the drawing and the appended claims.

BRIEF DESCRIPTION OF THE DRAWING

FIG. 1 is a perspective view of a safety belt clamp apparatus embodying the present invention.

FIG. 2 is a top plan view of the apparatus shown in FIG. 1.

FIG. 6 is a perspective view of the apparatus shown in FIG. 5.

FIG. 7 is a perspective view of a clamp apparatus as shown in FIG. 1, engaging a horizontal beam.

FIG. 8 is a perspective view of a clamp apparatus as shown in FIG. 3, engaging a vertical beam.

DETAILED DESCRIPTION

Figure 3:
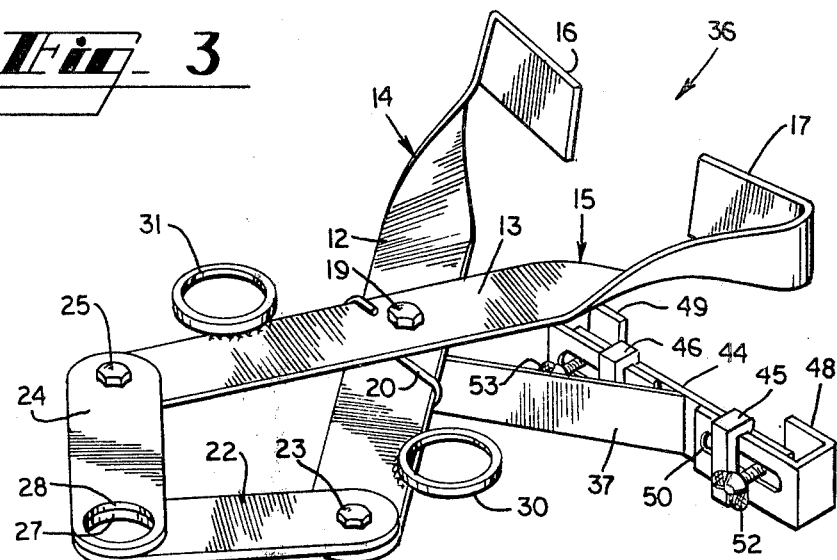
FIG. 3 is a perspective view of a second embodiment of a safety belt clamp apparatus embodying the present invention.

Referring now in more detail to the drawing, in which like numerals represent like parts throughout the several views, FIG. 1 shows a safety belt clamp apparatus 10 embodying the present invention. The clamp apparatus 10 includes a pair of arms 12 and 13 disposed to cross one another at a point intermediate the ends thereof. The arms 12 and 13 are formed of flat strips of metal, or other material of suitable strength, pivotally connected by a bolt 19 at the point where the arms cross. On one side of the pivotal connection, the arms 12 and 13 are twisted 90° at locations 14 and 15, respectively so that the plane of the flat metal strips is at right angles to the plane of the strips at the pivotal connection.

At the ends of the arms 12 and 13 beyond the twisted portions 14 and 15, the ends bend toward one another to form hook members 16 and 17, respectively, which form acute angles with their respective arms 12 and 13. The hook members 16 and 17 are shaped to engage a beam as will become apparent from the following description. A spring 20 of highly resilient metal wire passes around the bolt 19 at the pivotal connection of the arms 12 and 13, and is hooked about each of the arms 12 and 13 in a manner so that the ends of the arms are urged toward one another.

At the ends of the arms 12 and 13 opposite the hook members 16 and 17, connecting members 22 and 24 are pivotally connected to the arms 12 and 13 by bolts 23 and 25, respectively. The connecting members 22 and 24 are preferably formed of the same metal strip material that forms the arms. The connecting members 22 and 24 extend away from their connection to the respective arms for a length shorter than the length of the arms. At the end of the connecting members 22 and 24 opposite the pivotal connections to the arms 12 and 13, the connecting members define a pair of matching clip-receiving openings 27 and 28, respectively. The extending ends of the connecting members 22 and 24 are not connected except by means of a safety belt clip (forming no part of the present invention) extending through the openings 27 and 28, as shown in FIG. 7.

In order to permit more than one person to connect a safety belt to a particular clamp apparatus 10, each of the arms 12 and 13 carry a clip-receiving ring 30 and 31 which can be welded to the edge of the arms 12 and 13. The rings 30 and 31 are located preferably between the pivotal connection of the arms and the ends of the arms to which the connecting members are attached.

Use of the embodiment of the invention shown in FIGS. 1 and 2 can be seen by reference to FIG. 7, where the apparatus 10 is shown engaging a horizontal I-beam 32. In order to place the hook members 16 and 17 onto the I-beam, the arms 12 and 13 are pivoted to open the hook members, such as by pulling apart on the rings 30 and 31. The hook members 16 and 17 are then passed around the flange 32' of the I-beam and the pressure of the spring 20 is permitted to move the hook members 16 and 17 together until they are firmly engaged on the I-beam flange. Then the clip-receiving openings 27 and 28 are aligned, and a safety belt clip 33 is engaged through both such openings. It will be seen that any pressure exerted on the clip 33, such as when a person connected to the clip 33 falls, will cause a scissor-like action of the clamp 10, further pressing the hook members 16 and 17 into engagement with the I-beam flange. One or two additional safety clips 33 attached to other persons may be engaged with the clip-receiving rings 30 and 31, as shown in FIG. 7.

In order to release the engagement of the hook members 16 and 17 with the I-beam, the connecting members 22 and 24 need merely be urged toward the I-beam against the pressure of the spring 20. This separates the hook members and allows the apparatus to be removed. If desired, the apparatus 10 can be slid longitudinally along the I-beam flange 32' as the worker moves adjacent to the beam, after exerting slight pressure against the spring 20 to loosen the hook members 16 and 17. This feature provides maximum safety during lateral movement of the worker because the clamp apparatus 10 is never fully disengaged from the I-beam 32, and would remain engaged if the worker should fall during such lateral movement. Further urging of the connecting members 22 and 24 toward the I-beam causes the hook members 16 and 17 to separate widely enough to be disconnected from the I-beam.

Although an I-beam is depicted in the drawing, it should be understood that the present invention can be clamped onto any type of structural member capable of being grasped by the clamp apparatus, and that the term "beam" is used generally herein to refer to any such structural member.

Figure 4:
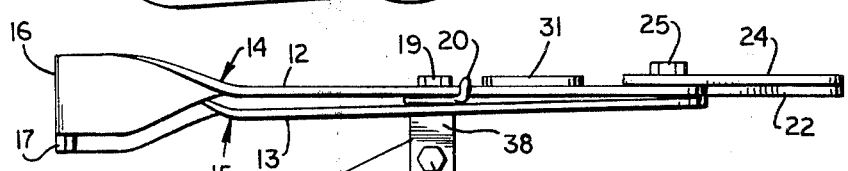
FIG. 4 is a side plan view of the apparatus shown in FIG. 3.

A second embodiment 36 of a safety belt clamp apparatus is shown in FIGS. 3 and 4. The second embodiment 36 of the invention is identical to the first embodiment shown in FIGS. 1 and 2, with the addition of a brace 37 extending diagonally from the pivotal connection of the arms 12 and 13 away from the plane of the arms in the direction of the hook members 16 and 17. The connection of the brace 37 to the arms 12 and 13 is by means of a U-shaped multi-pivot connector 38. The bottom of the "U" of the connector 38 is pivotally connected to the bolt 19. The brace 37 extends between the sides of the "U", and is pivotally retained therebetween by a bolt 39. It will thus be seen that the brace 37 is permitted to rotate about the bolt 39 toward and away from the arms 12 and 13, and also that the brace 37 and connector 38 are permitted to rotate about the bolt 19.

A cross member 44 is fixed to the extending end of the brace 37. The cross member 44 extends parallel to the hook members 16 and 17 on both sides of the brace 37 to form a "T". A pair of collars 45 and 46 is fixed to the cross member 44 on either side of the brace 37. The U-shaped collars 45 and 46 extend from the cross member 44 on the side of the cross member to which the brace 37 is attached, and define slots between the collars and the cross member 44. A pair of slidable jaw members 48 and 49 is provided at the ends of the cross member 44. The jaw members 48 are also U-shaped, one side of the "U" being slidably received between a collar 45 or 46 and the cross member 44. Longitudinal slots 50 and 51 extend through the side of the jaw members that passes through collars. Set screws 52 and 53 extend through the slots 50 and 51 and are threadably received by the cross member 44. The bottom of the "U" of the jaw members 48 and 49 extends past the ends of the cross member 44, so that the side of the "U" not received between a collar and the cross member extends in spaced apart relation from the cross member 44 back toward the brace 37.

Use of the second embodiment 36 of the clamp apparatus according to the present invention can be seen in FIG. 8, in which a clamp apparatus 36 is shown engaged with a vertically extending I-beam 55. After the hook members 16 and 17 have been engaged with the flange 55' of the I-beam 55, the set screws 52 and 53 are loosened and the slidable jaw members 48 and 49 are moved inwardly through the collars 45 and 46 until each of the jaw members fits snugly against the I-beam flange. The set screws 52 and 53 are then tightened in order to press the I-beam flange 55' against the jaw members 48 and 49. For sliding movement of the clamp apparatus 10 along the I-beam 55, the set screws 52 and 53 can be loosened. To remove the clamp apparatus 36 from the I-beam 55, the set screws 52 and 53 are loosened, the jaw members 48 and 49 are slid outwardly until they clear the I-beam flange 55', and the connecting members 22 and 24 are urged toward the I-beam so that the hook members 16 and 17 are disengaged from the I-beam.

Figure 5:
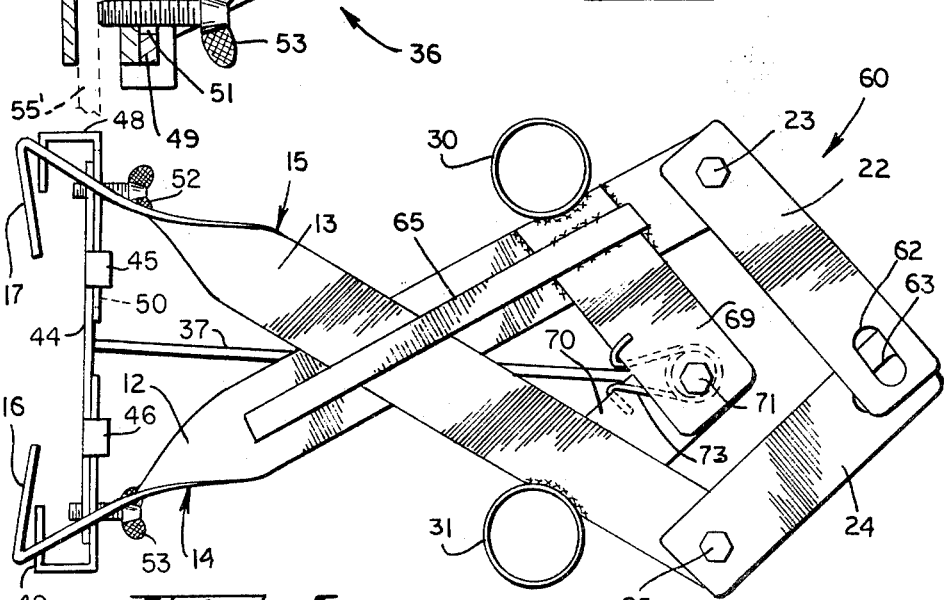
FIG. 5 is a top view of a third embodiment of a safety belt clamp apparatus embodying the present invention.

A third embodiment 60 of a safety belt clamp apparatus embodying the present invention is shown in FIGS. 5 and 6. The arms 12 and 13 and connecting members 22 and 24 are similar to the first and second embodiments of the invention, and are connected by bolts 23 and 25. However, in place of a fixed pivot bolt 19, the operative connection between the arms 12 and 13 is formed by an elongate retainer bar 65 spaced apart from the arm 12 on legs 66 and 67 by a distance slightly more than the thickness of the arm 13. The arm 13 extends through the slot formed between the retainer bar 65 and the arm 12.

The embodiment shown in FIG. 6 further includes a pair of link members 69 and 70 fixed at one end thereof to the arms 12 and 13, respectively, at a point between the operative interconnection between the arms and the ends of the arms to which the connecting members 22 and 24 are pivotally connected. The link members extend from the arms between the arms, and the extending ends of the link members are pivotally connected to each other by a bolt 71. A spring 73 passes around the bolt 71 and engages the link members 69 and 70 so as to urge them apart. It will be seen that when the link members 69 and 70 are urged apart, the hook members 16 and 17 are urged together. As shown in FIGS. 5 and 6, the clip-receiving openings 62 and 63 in the connecting members 22 and 24 are elongate slots, rather than the round openings 27 and 28 shown in FIG. 1.

If it is desired to utilize a brace and jaw assembly with the third embodiment 60 for placement on a vertical beam, a U-shaped connector 72 can be attached at the pivot bolt 71 connecting the link members 69 and 70. The U-shaped connector 72 is similar to the connector 38 shown in FIG. 4.

The manner of operation of the third embodiment shown in FIGS. 5 and 6 is identical to that described above for the other embodiments of the invention. However, the operative interconnection between the arms 12 and 13 provided by the retainer bar 65 provides greater flexibility in the size of beams to which the clamp apparatus 60 can be attached.

It will thus be seen that the present invention provides a safety belt clamp apparatus having significant advantages over the prior art. The various embodiments described above can be connected and disconnected to a beam with ease, or slid along the beam to provide safety during certain movements of a worker. Furthermore, in one embodiment of the invention, means is provided for readily connecting the apparatus to a vertically extending beam to provide safety for workers when a horizontally extending beam is not readily available.

While this invention has been described in detail with particular reference to preferred embodiments thereof, it will be understood that variations and modifications can be effected without departing from the spirit and scope of the invention as described hereinabove and as defined in the appended claims.

We claim:

1. A clamp apparatus for releasably connecting a safety belt or harness to a beam, comprising:
    a pair of arms pivotally connected intermediate the ends thereof and each defining at a first end thereof an inwardly turning hook member;
    a pair of connecting members, one pivotally connected to a second end of each of said arms at one end of each of said connecting members, and defining therein adjacent to the other end of each of said connecting members a clip receiving opening;
    a brace extending diagonally from the connection of said arms away from the plane of said arms in the direction of said hook members, said brace being connected to said arms for pivotal movement both about the axis of said pivotal connection between said arms and toward or away from said arms;
    jaw means on said brace spaced apart from said arms for engaging said beam at a location spaced apart from the point at which said hook members engage said beam;
    a pair of clip receiving rings, one attached to each of said arms between the second ends of said arms and the pivotal connection of said arms; and
    a spring urging said hook members toward one another,
    whereby a plurality of safety belt clips can be engaged with said clip openings and said rings, the force exerted on said belts causing said hook members to be urged against a beam therebetween.

2. A clamp apparatus for releasably connecting a safety belt or harness to a beam, comprising:
    a pair of arms operatively interconnected for scissor-like movement, said arms each defining an inwardly turning hook member at a first end thereof for engaging said beam,
    said operative interconnection between said arms comprising an elongate retainer bar mounted on one of said arms in spaced apart relation thereto to form an elongate slot between said retainer bar and said arm, the other of said arms being inserted through said slot between said retainer bar and said arm;
    a pair of connecting members, each pivotally connected to a second end of each of said arms and defining therein a clip receiving opening spaced apart along said connecting member from said arm;
    a brace extending diagonally from said arms intermediate the ends thereof away from said arms in the direction of said hook members; and
    jaw means mounted on the depending end of said brace for engaging said beam at a location spaced apart from said hook members.

3. The apparatus of claim 2, further comprising:
    a pair of link members, one fixed to each of said arms between said operative interconnection of said arms and said connecting member and extending away from said arm to be pivotally connected to said other link member between said arms; and wherein
    said brace extends diagonally from said connection of said link members.

4. The apparatus of claim 3, wherein said brace is pivotally mounted for movement about the axis of said connection between said link members, and about an axis perpendicular to said axis of connection between said link members.

5. The apparatus of claim 3, further comprising a spring mounted to urge said link members apart.

* * * * *